(No Model.)

L. S. WOODBURY.
THROTTLE VALVE.

No. 318,072. Patented May 19, 1885.

Witnesses.
F. G. Coggin,
Jas. M. Merton.

Inventor.
Leander S. Woodbury

UNITED STATES PATENT OFFICE.

LEANDER S. WOODBURY, OF CALUMET, MICHIGAN.

THROTTLE-VALVE.

SPECIFICATION forming part of Letters Patent No. 318,072, dated May 19, 1885.

Application filed December 15, 1884. (No model.)

*To all whom it may concern:*

Be it known that I, LEANDER S. WOODBURY, a citizen of the United States, residing at Calumet, in the county of Houghton and State of Michigan, have invented new and useful Improvements in Throttle-Valves, set forth in the annexed specification.

My invention relates to an improvement in throttle-valves used in rock-drills and similar machines, having the following objects: first, to increase its durability by avoiding the wear incident to the throttles in common use, which very soon renders them useless; second, to compensate for or take up the wear in certain parts, which would otherwise become loose and inefficient; third, to facilitate repairs, so that the parts most liable to give out may be readily made good by the one using the valve without delaying the machine to which it may be applied; fourth, to avoid attached parts that are liable to be loosened and deranged by the jar or shock incident to the class of machines to which the valve is attached.

These objects are fully accomplished in valves now in practical operation made as illustrated in the accompanying drawings, in which—

Figure 1:
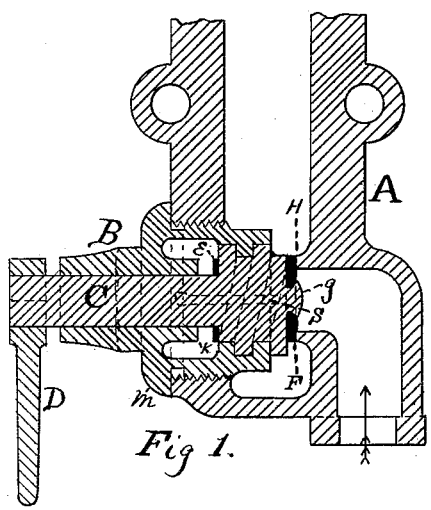
Figure 2:
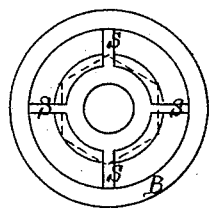
Figure 3:
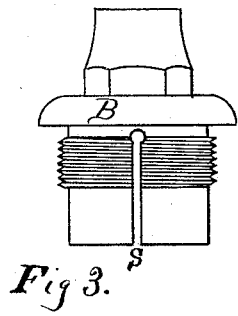

Figure 1 is a horizontal longitudinal section through the center of valve, showing also a part of the air or steam chest. Fig. 2 is a plan of gland B, looking from the bottom. Fig. 3 is a side elevation of the gland B, for the purpose of more clearly showing the method of splitting the same by the slots.

Similar letters refer to similar parts throughout the views, in which A is a part of the air or steam chest, upon which is formed the valve-seat H. C is the valve-stem, and B the gland in which it works. F is the valve, which is a disk of some yielding material, as leather, rubber, &c. $g$ is a button forming a part of the stem C, for the purpose of holding the valve F, but around which the valve can revolve. E is a copper disk making a joint upon the seat K when the valve is open, to prevent leakage around stem C. S S, &c., are slots splitting the gland B, for purposes hereinafter described. D is the handle for operating the valve. The pressure of steam or air is under the valve, as indicated by the arrow.

Having thus described the parts and their objects, I will proceed to describe their operation, especially as applied to rock-drills used in mines, where air-pressure is the motive-power. The throttle usually used is a combination of a plug-cock with the air-chest.

In using rock-drills in mines the hose used for conveying air to the drill is frequently detached to allow change of drill and other operations. While thus detached, the dust and small particles of rock or sand produced in mining operations find their way into it, and when the drill is started again this gritty material is carried to the throttle, through the plug of which it has to pass, and by the repeated opening and closing of the cock it is brought in contact with the wearing-surfaces, which are rapidly cut away, and the cock not only becomes leaky, but so loose, also, that with the constant jar of the drill it will not remain open. When this condition obtains, the drill must be stopped and the chest sent to the shop for repairs, which usually requires an entire new cock.

Referring now to the drawings, the operation and method of construction to obviate these difficulties will be readily seen. The thread on the stem C is such that one-quarter of a turn with the handle D opens the valve wide. In construction the gland B is threaded at its lower end to receive the stem. It is then slotted, as at S, any desired number of times. The jaws thus formed are then set in so that their inside diameter is a trifle less than before. This creates a friction that will hold the valve in position whether it be open or closed, and the spring of the jaws will for a long time compensate for any wear that may come to that part of the stem, and should it ever become loose the jaws can easily be closed in still farther, to renew the friction and compensate for further wear. The same results would obtain by making the original thread in the gland B a trifle smaller in diameter than the thread on the stem C, and slotting, as already described. Should any particles of sand or rock be caught between the valve and seat, they will be embedded in the valve, and as the valve will easily revolve around the button $g$ the seat is not likely to become injured. Should the valve F become injured, it can easily be replaced by any one using the drill by taking out the gland B and slipping a new disk over the button $g$. The pressure always being under the valve, it is not liable to become detached. The repairs on account of wear and the delays on account of stoppage are thus reduced to a minimum.

It is absolutely essential that the button $g$ be a part of and solid with the stem C, as no other device for holding the valve F in place will stand the jar and shock of the drill.

I make no claim upon the valve F or the method of attachment as showing any novelty.

The splitting of that portion of the gland whose function is that of a nut should not be confounded with the split nut of Vaughn, No. 219,783, September 16, 1879, "lock-nuts," nor with the nuts referred to in that patent, as its construction, office, and operation are entirely different.

I lay no claim to the mere splitting of that part of the gland whose function is that of a nut.

What I claim as new, and desire to secure by Letters Patent, is—

In a throttle-valve for a rock-drill, a combination of the stem C, valve F, and seat H with the gland B, constructed substantially as shown, to serve as both a gland for the stem and a nut for the thread of the stem, the part serving as a nut being split, substantially as shown, for the purpose of obtaining a moderate friction upon the screw and compensation for any wear at that point.

LEANDER S. WOODBURY.

Witnesses:
F. G. COGGIN,
D. T. MACDONALD.